US005921823A

United States Patent [19]
Bernardini

[11] Patent Number: 5,921,823

[45] Date of Patent: Jul. 13, 1999

[54] DEAD-FRONT HIGH CURRENT FEMALE POWER CONTACT

[75] Inventor: Allen J. Bernardini, Southbury, Conn.

[73] Assignee: Litton Systems, Inc., Watertown, Conn.

[21] Appl. No.: 08/904,525

[22] Filed: Aug. 1, 1997

[51] Int. Cl.[6] .......... H04B 3/36

[52] U.S. Cl. .......... 439/889; 439/188; 439/335; 439/700; 439/824

[58] Field of Search .......... 439/180, 188, 439/335, 700, 824, 842, 889; 200/51.09–51.13, 43.04, 43.05, 250, 253.1, 260, 538, 540, 541

[56] References Cited

U.S. PATENT DOCUMENTS 2,729,800 1/1956 Knudsen .......... 439/335
4,818,237 4/1989 Weber .......... 439/693
5,015,195 5/1991 Piriz .......... 439/889
5,681,187 10/1997 Fukushima et al. .......... 439/700

*Primary Examiner*—Steven L. Stephan
*Assistant Examiner*—Brian J. Biggi
*Attorney, Agent, or Firm*—Michael H. Wallach

[57] ABSTRACT

A female power contact which is energized only upon insertion of a male plug. The contact includes a plunger which is biased toward a position which blocks accidental finger insertion into the contact. The plunger also contains sharp points on its outer edge to further prevent accidental finger insertion into the contact. However, insertion of the male plug into the female power contact, against the spring bias, causes the plunger to depress the spring in order to produce an electrical connection between the male plug and female contact.

8 Claims, 2 Drawing Sheets

DEAD-FRONT HIGH CURRENT FEMALE POWER CONTACT

FIELD OF THE INVENTION

The invention relates in general to electrical connectors and more specifically to a female power contact with a safety feature which helps to prevent industry workers from electrocution.

BACKGROUND OF THE INVENTION

It is well-known that a high current electrical connection is very dangerous and may cause a person to be critically injured. Electrocution is a major concern for not only children and adults at home but also for many industrial workers. Due to the size of high current socket contacts in industrial plants, it is easy for a person to poke a finger or other objects into a socket opening and touch electrically-live metal components within the socket. There have been numerous efforts to overcome this problem as outlined in the following patents:

U.S. Pat. No. 5,113,045 Crofton

U.S. Pat. No. 5,069,632 Avitan

U.S. Pat. No. 5,147,988 Appleton

U.S. Pat. No. 5,256,076 Hamlin

U.S. Pat. No. 4,148,536 Petropoulos

U.S. Pat. No. 5,586,646 Bridgeman

U.S. Pat. No. 5,112,237 Yang

U.S. Pat. No. 5,095,182 Thompson

U.S. Pat. No. 4,652,067 Lutzenberg

U.S. Pat. No. 5,186,639 Comerci

As discussed in greater detail below, the preponderance of prior art concentrates on enhancing safety at home and not at the workplace. Several prior art socket arrangements are disclosed which incorporate devices and structures for avoiding accidents at home but the prior art generally neglects the problem of protecting industrial workers from electrocution.

U.S. Pat. No. 5,113,045, entitled Safety Outlet, describes a safety outlet which requires male prongs to force a pair of plungers into making contact with a pair of switches. The prongs are inserted into the outlet in order to depress the plungers which, in turn, closes the switches and initiates a supply of current to the prongs. The plungers are positioned in a manner by which the insertion of foreign objects will not exert enough pressure to depress the plungers. This is the safety feature of the outlet.

U.S. Pat. No. 5,069,632, entitled Electrical Supply Safety Socket, describes a safety socket which is activated only when female socket outlets are forced into contact with energized components by insertion of a plug. Insertion of the plug activates a spring-biased switch which biases two armatures between open and closed positions. The armatures are articulated to a pivotally mounted support in order for them to be displaceable toward and away from each other. This prior art device also reduces the chance of electrocution by requiring two objects to be inserted in order to overcome both the spring-biased switch and the contact armatures.

U.S. Pat. No. 5,147,988, entitled Switching Electrical Receptacle, describes a power receptacle having a housing with sliding contacts of cylindrical symmetry which can be manually engaged. The housing slides into and out of an electrical connection with female contacts in order to make or break a circuit. The female contacts are connected to load terminals.

U.S. Pat. No. 5,256,076, entitled Safety Electrical Receptacle, describes a receptacle which does not allow current flow until switches are closed by an inserted plug.

The plug depresses an operating lever which, in turn, creates a connection between movable and fixed contacts. According to one embodiment, the plugs contain special posts in order to activate the switches. In another embodiment, the grounding tine is used to close switches which help transmit electrical energy to output wiring.

U.S. Pat. No. 4,148,536, entitled Safety Electrical Receptacle, describes a receptacle which only operates when its female contacts are energized after the insertion of prongs. The prongs push an insulative member in order to establish a connection between a contact arm and a power line connector.

U.S. Pat. No. 5,586,646, entitled Vehicle Locking System, describes a sliding contact linear switch. A system is disclosed which uses an actuator plunger, shiftable between two positions to lock and unlock a vehicular door.

U.S. Pat. No. 5,112,237, entitled Safety Plug Receptacle, describes a receptacle which requires the body of a male plug to depress its spring loaded pin in order to engage an internal switch. The switch turns on a LED to notify the user that a connection is made. This prior art device prevents the possibility of short circuiting wires.

U.S. Pat. No. 5,095,182, entitled Shockproof Safety Outlet, describes a socket with two blade slots which prevents users from receiving shocks. The longer of the two blades is used to activate the supply current.

U.S. Pat. No. 4,652,067, entitled Electrical Connector with an Internal Switch, describes an electrical connector whose plunger is operable by the body of a male contact during insertion. Depending on the presence or lack of presence of a plug, the internal switch moves the plunger to open and closed positions.

U.S. Pat. No. 5,186,639, entitled Electrical Connector with Plug Detection Switch, describes the use of a switch mechanism to detect the presence of a fully inserted plug and then produces a supply current.

SUMMARY OF THE INVENTION

The present invention is directed at a solution to the problem of protecting persons in industry who work with high current socket contacts from electrocution. As discussed above, due to the physical size of high current socket contacts, it is easy for a person to poke a finger into the front hole and touch electrically-live metal components. This is, of course, very dangerous and, according to the present invention, a socket contact is provided which significantly prevents this from happening.

According to the invention, a female contact is provided for creating an electrical connection only upon insertion of a male plug. Insertion of a foreign object such as a finger will not produce a connection and thus there is no threat of electrocution. The female contact of the invention consists of two separate areas, one which is energized and one which is unenergized. Within the contact is a biased plunger. The plunger is biased to a first position for blocking fingers and other extraneous objects from entering the female contact. The plunger can be moved by the male plug, against the spring biasing, to a position which completes the electrical connection between the male plug and the female contact.

BRIEF DESCRIPTION OF THE DRAWINGS

Various embodiments of the invention are described below with reference to the accompanying drawings, in which.

DETAILED DESCRIPTION OF THE PREFERRED EMBODIMENTS

Figure 1:
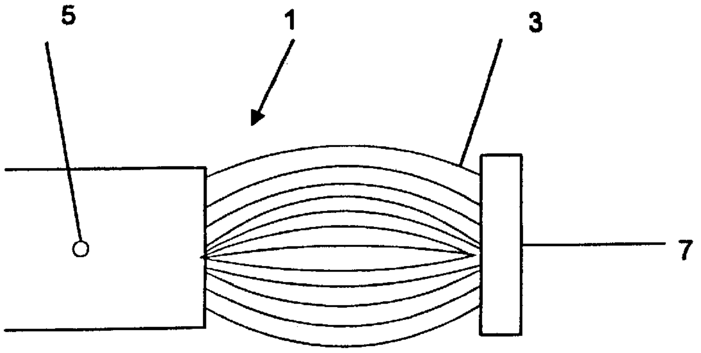
FIG. 1 is a drawing of a male contact.

FIG. 1 shows a male plug 1 which has a contact mating area, consisting of louver springs 3, a mating pin 5 and an insulated male contact tip 7.

Figure 2:
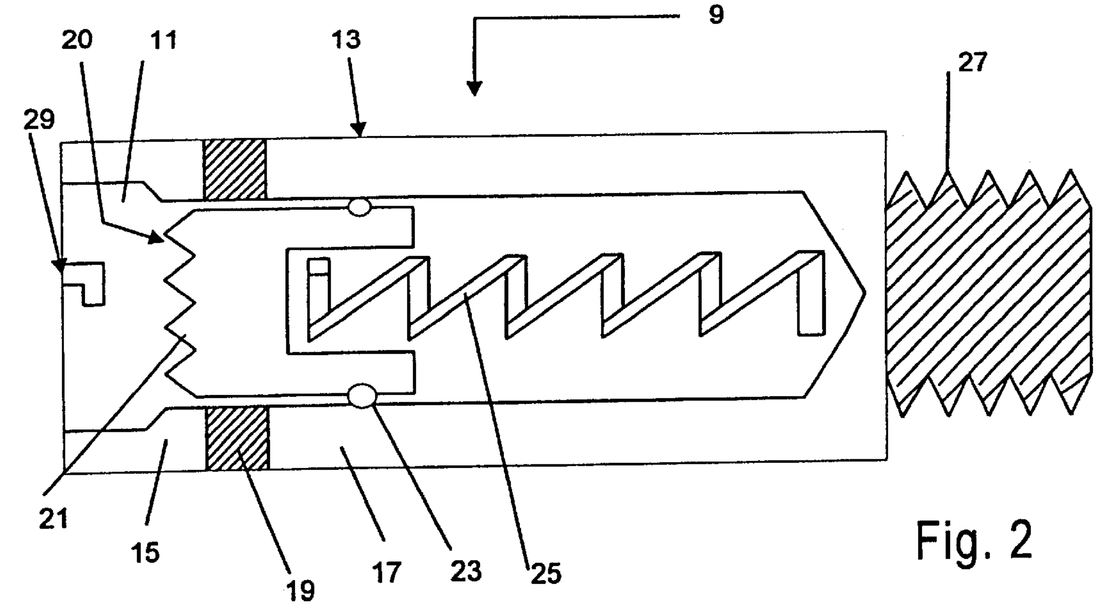
FIG. 2 is a schematic illustration showing a first embodiment of the invention in which the thrust spring is uncompressed.

FIG. 2 shows a female socket 9, according to a first embodiment of the invention, which contains a large diameter entry bore 11, within an outer sleeve 13, housing an electrically unenergized area 15 and an electrically energized area 17, separated by an insulator 19. The bore 11 houses a biased plunger 20 comprising a non-conductive plunger 21 which bars entry into the energized area 17. The bore/spring area around the plunger 21 is sealed off by an O-ring 23.

The plunger 20 also contains a large thrust spring 25 to force the plunger 21 forward in the bore 11 thereby preventing accidental touching of the energized area 17. The unenergized area 15 and the energized area 17 are electrically isolated and the spring 25 resists depression of the plunger 21.

Cable termination is achieved through a threaded bolt 27 although a crimp, solder barrel or flat blade may also be used.

A dog leg lock 29 is used for retention of the male plug 1 via mating pin 5.

Figure 3:
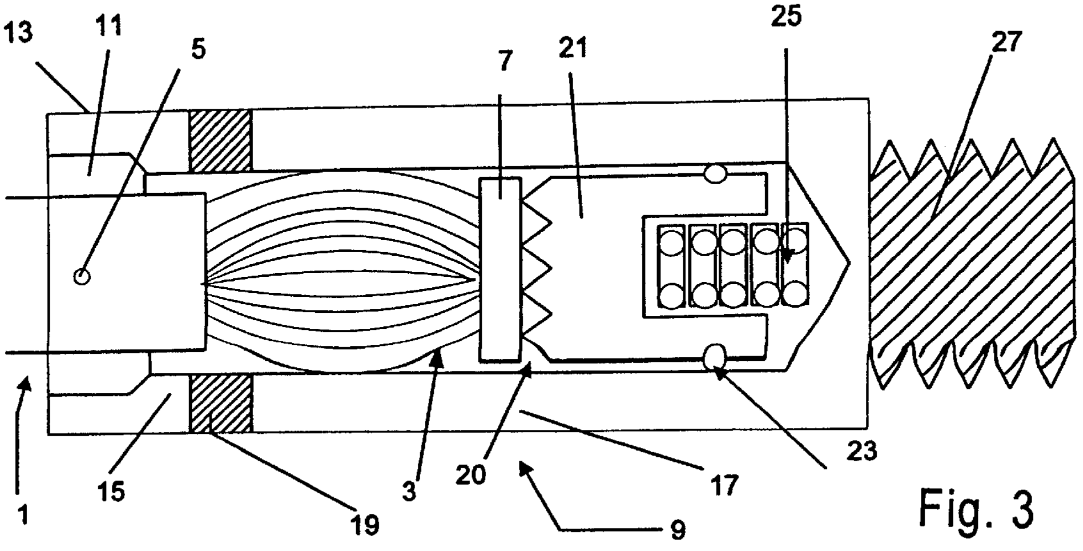
FIG. 3 is a schematic illustration showing the embodiment of FIG. 2 in which the thrust spring is compressed.

Upon insertion of the male plug 1 into the female socket 9 (FIG. 3), physical contact is made between the male contact 7 and the insulated plunger 21. The inward force applied by the male plug 1 depresses the thrust spring 25 which allows the insulated plunger 21 to recede into the bore 11 until the male plug 1 is fully mated and locked via a quarter-turn twist with the mating pin 5 fitting with the dog leg lock 29. In this position, the conductive louver springs 3 of the contact mating area of plug 1 are connected with the energized area 17 and an electrical connection is produced.

Figure 4:
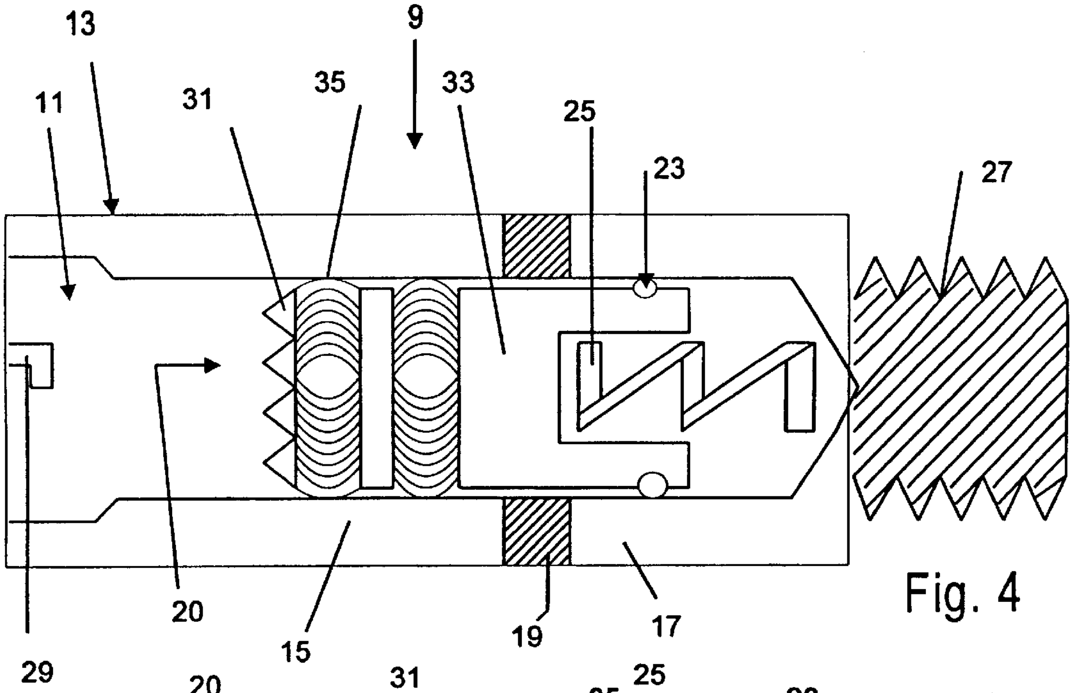
FIG. 4 is a schematic illustration showing a second embodiment of the invention in which the thrust spring is uncompressed.
Figure 5:
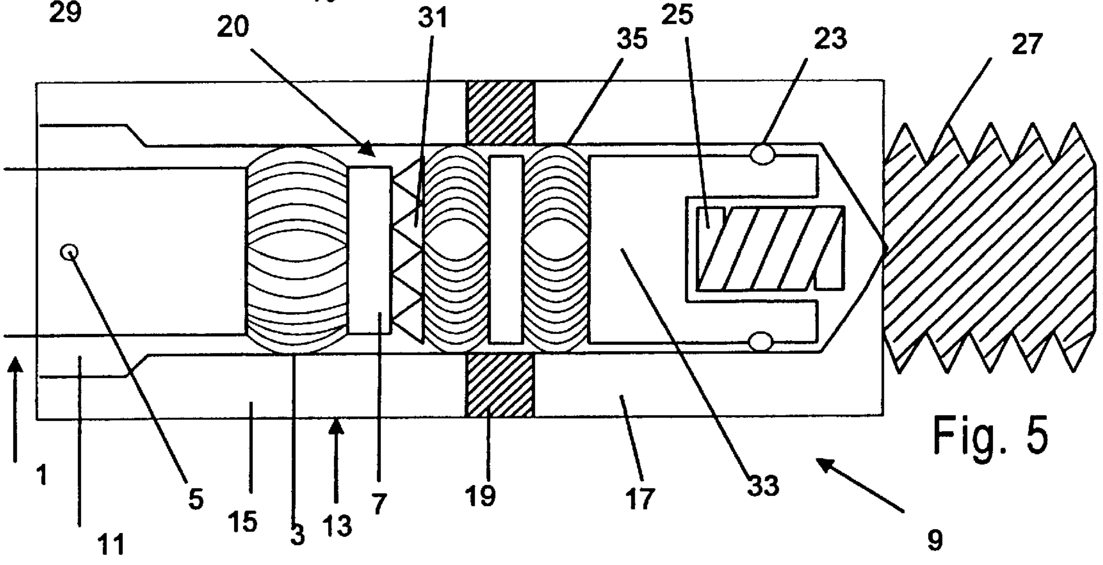
FIG. 5 is a schematic illustration showing the embodiment of FIG. 4 in which the thrust spring is compressed.

FIG. 4 shows another embodiment of the female socket 9. The second embodiment works in the same manner as the first embodiment with the following differences. Within the bore, a recessed conductive pin with a non-conductive tip 31, connected to an insulated or uninsulated plunger cap 33, is fitted with either single, double or multi-louver spring bands 35, depending on the voltage applied. Use of louver spring bands 35 allows for a large current flow. The biased plunger 20 slides back and forth within the bore 11 in order to provide an electrical bridge between the energized area 17 and area 15 through the louver springs bands 35 and the conductive pin 31.

In use, the thrust spring 25 forces the conductive pin 31 away from the energized area 17. With the spring 25 fully extended, the conductive pin 31 remains fully in the unenergized area 15, and is unenergized. Insertion of the male plug 1 so as to force the conductive pin 31 into the bore 11 produces an electrical bridge across the insulator 19 and creates an electrical circuit between the male plug 1 and the female socket 9. The electrical path goes from the energized area 17 to area 15 via the louver spring bands 35 and the conductive pin 31, and then from the previously unenergized area 15 to the contact mating area 3 of the male plug 1.

Neither of the two embodiments discussed above should be connected or disconnected under load.

Figure 6:
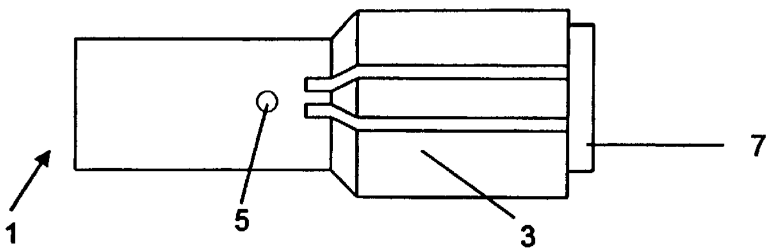
FIG. 6 is a drawing of an alternate male contact.

FIG. 6 shows an alternate male plug 1 which has a contact mating area 3, a mating pin 5 and an insulated male contact tip 7.

It will be appreciated that, although two particular embodiments of the invention have been described and illustrated in detail, various changes and modifications may be made. One such modification is that the dog leg lock 29 may be omitted if the male plug 1 is not of a specific single-pole connector family produced by Litton. All such changes and modifications may be made without departing from the sphere and scope of the invention as defined by the afforded hereto.

I claim:

1. A female contact for receiving and electrically connecting a male plug, comprising:

an outer sleeve having a large diameter entry bore for receiving and contacting said male plug, an inner portion of said sleeve being electrically energized, an outer portion of said sleeve being electrically unenergized, and a biased plunger within the sleeve, adapted to move in response to an inwardly directed force by said male plug from a first position, for preventing unauthorized access from said outer portion to said inner portion, to a second position, for electrically connecting said male plug to said energized inner portion.

2. The female contact of claim 1 wherein said biased plunger further includes:

a spring which, when uncompressed, biases said biased plunger to said first position, and a non-conductive plunger for preventing unauthorized access to said inner portion when said plunger is biased to said first position and permitting said male contact to enter and contact said inner portion when said spring is compressed such that said plunger is moved to said second position.

3. The female contact of claim 1 wherein said biased plunger further includes:

a spring which, when uncompressed, biases said biased plunger to said first position, and conductive means to connect said inner portion and said outer portion when said spring is compressed.

4. The female contact of claim 3 wherein said conductive means further includes:

a pair of louver springs surrounding a conductive pin such that an outermost one of said louver springs contacts said outer portion and an innermost one of said louver springs contacts said inner portion when said biased plunger is in said second position, thereby providing electrical contact between said inner portion and said outer portion for energizing said male plug.

5. The female contact of claim 3 wherein said biased plunger is recessed within the bore.

6. The female contact of claim 1 wherein said biased plunger contains sharp points at its outer edge to further prevent unauthorized access to the inner portion.

7. The female contact of claim 1 wherein said inner portion is terminated by cable termination means.

8. The female contact of claim 7 wherein said cable termination means comprises one of either a threaded bolt, a crimp, a solder barrel or a flat blade.

* * * * *